US008272171B2

(12) United States Patent
Curry, III

(10) Patent No.: US 8,272,171 B2
(45) Date of Patent: Sep. 25, 2012

(54) HURRICANE CABLE SYSTEM AND METHOD OF USE THEROF

(76) Inventor: James Curry, III, Massapequa, NY (US)

( * ) Notice: Subject to any disclaimer, the term of this patent is extended or adjusted under 35 U.S.C. 154(b) by 0 days.

(21) Appl. No.: 12/722,201

(22) Filed: Mar. 11, 2010

(65) Prior Publication Data
US 2011/0036020 A1    Feb. 17, 2011

Related U.S. Application Data

(60) Provisional application No. 61/159,218, filed on Mar. 11, 2009.

(51) Int. Cl.
*E04B 7/00* (2006.01)
(52) U.S. Cl. ..... 52/23; 52/698; 52/DIG. 11; 52/DIG. 12
(58) Field of Classification Search .......... 52/3–5, 52/23–24, 167.1, DIG. 11, DIG. 12, 741.3, 52/698, 707, 292, 294–295, 148
See application file for complete search history.

(56) References Cited

U.S. PATENT DOCUMENTS

| | | | | |
|---|---|---|---|---|
| 269,018 | A * | 12/1882 | Crowell et al. | 52/23 |
| 777,441 | A * | 12/1904 | Small | 52/23 |
| 1,864,403 | A * | 6/1932 | Bradley | 403/213 |
| 3,939,729 | A * | 2/1976 | Brockelsby | 74/575 |
| 5,319,896 | A * | 6/1994 | Winger | 52/23 |
| 5,537,786 | A * | 7/1996 | Lozier et al. | 52/23 |
| 5,570,545 | A * | 11/1996 | Adams | 52/23 |
| 5,623,788 | A * | 4/1997 | Bimberg et al. | 52/23 |
| 5,687,512 | A * | 11/1997 | Spoozak et al. | 52/23 |
| 6,722,085 | B2 * | 4/2004 | Pittman | 52/23 |
| 7,484,334 | B1 * | 2/2009 | Oviedo-Reyes | 52/23 |
| 2008/0280554 | A1 * | 11/2008 | Kortuem et al. | 454/260 |
| 2009/0000211 | A1 * | 1/2009 | Lozier et al. | 52/23 |

* cited by examiner

*Primary Examiner* — Basil Katcheves
*Assistant Examiner* — Beth Stephan
(74) *Attorney, Agent, or Firm* — Scully, Scott, Murphy & Presser, P.C.

(57) ABSTRACT

A system and method for resisting catastrophic wind damage to a structure is provided. At least a pair of anchoring devices are fixed to a foundation of the structure at opposite positions adjacent to sidewalls of the structure. A first cable and a second cable are attached to the anchoring devices, respectively. A tensioning member is provided under a roof of the structure and between the sidewalls of the structure. The tensioning member, such as a turnbuckle, is further attached to both the first and second cables for applying a tension force to the cables. Cable guides can be further provided to route the cables along the roof and sidewalls of the structure.

11 Claims, 6 Drawing Sheets

HURRICANE CABLE SYSTEM AND METHOD OF USE THEROF

FIELD OF THE INVENTION

The present invention relates generally to building construction; and more specifically, the present invention relates to a hurricane cable system and method of use thereof for maintaining structural integrity under high wind conditions.

BACKGROUND OF THE DISCLOSURE

Each year hurricanes, nor'easters, and other extreme-wind storms result in billions of dollars in damage. While flooding caused by hurricanes receives greater attention, a significant portion of damage is the result of the high winds experienced by building structures that were not built to withstand such forces.

Residential homes, with their wood-frame construction and numerous windows, are most susceptible to wind damage. Often severe winds can literally tear roofs from homes because of pressure differences between the internal pressure of the house and the external pressures resulting from the high wind. The low pressure lift forces that result in most roof damage is caused by wind traveling further along one plane of a roof versus the other plane. This lifting force is similar to lifting forces experienced by an airplane wing. The severity of the lifting force is determined by the pitch of the roof.

Low pressure generally occurs on the side of roof opposite of wind direction. Thus the roof opposite the wind direction will experience lifting. This often results in damage or even catastrophic failure of the roof structure in cases where the wind speed is high enough. Hurricane force winds are anywhere from 74 mph, in a Category 1 hurricane, to over 156 mph, for a Category 5 hurricane. Such high winds can produce sufficient uplift forces to tear a roof from a structure.

SUMMARY OF THE DISCLOSURE

According to one aspect, the present invention provides a hurricane cable system for resisting catastrophic damage to a structure having a roof, opposite sidewalls and a foundation. The system includes at least a pair of first and second anchoring members, each fixed to the foundation at a position adjacent to a respective sidewall. The system further includes a first cable having a first end and a second end, the first end of the first cable attached to the first anchoring device. The system further includes a second cable having a first end and a second end, the first end of the second cable attached to the second anchoring device. The system further includes a tensioning member disposed under the roof and between the side walls, the tensioning members attached to the second end of the first cable and the second end of the second cable, for applying a tension force to the first cable and the second cable. The system further includes a plurality of cable guides affixed at intervals along the roof, each of the cable guides having an opening adapted for receiving a cable.

Preferably, an interval between the cable guides is six feet or less.

Preferably, the first cable and the second cable are ⅛ inch steel cables.

According to another aspect, the present invention provides a coordinate system for resisting catastrophic wind damage to a structure having a roof, opposite sidewalls and a foundation. The coordinate system includes a plurality of hurricane cable systems. Each hurricane cable system includes at least a pair of first and second anchoring members, a first cable, a second cable and tensioning member. Each anchoring member is fixed to the foundation at a position adjacent to a respective sidewall. A first end of the first cable is attached to the first anchoring device, and a first end of the second cable is attached to the second anchoring device. The tensioning member is disposed under the roof and between the side walls, and the tensioning members is attached to a second end of the first cable and a second end of the second cable, for applying a tension force to the first cable and the second cable. A plurality of cable guides is affixed at intervals along the roof, each of the cable guides having an opening adapted for receiving a cable.

Preferably, the plurality of the hurricane cable systems are disposed at predetermined intervals along a lateral direction of the structure. More preferably, the plurality of hurricane cable systems are disposed parallel to each other.

Preferably, an interval between the cable guides is six feet or less.

Preferably, the first cable and the second cable are ⅛ inch steel cables.

According to yet another aspect, the present invention provides a method for resisting catastrophic wind damage to a structure having a roof, opposite sidewalls and a foundation. The method includes fixing a first anchoring device and a second anchoring device to the foundation at positions adjacent to the sidewalls, respectively. The method includes attaching a first cable to the first anchoring device and a second cable to the second anchoring device. The method includes disposing a tensioning member under the roof and between the sidewalls. The method includes attaching the tensioning member to both the first cable and the second cable. The method further includes applying a tension force to the first cable and the second cable through the tensioning member.

Preferably, the method includes routing the first cable and the second cable through a plurality of cable guides.

Preferably, the method includes distributing the cable guides at predetermined intervals along the roof.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
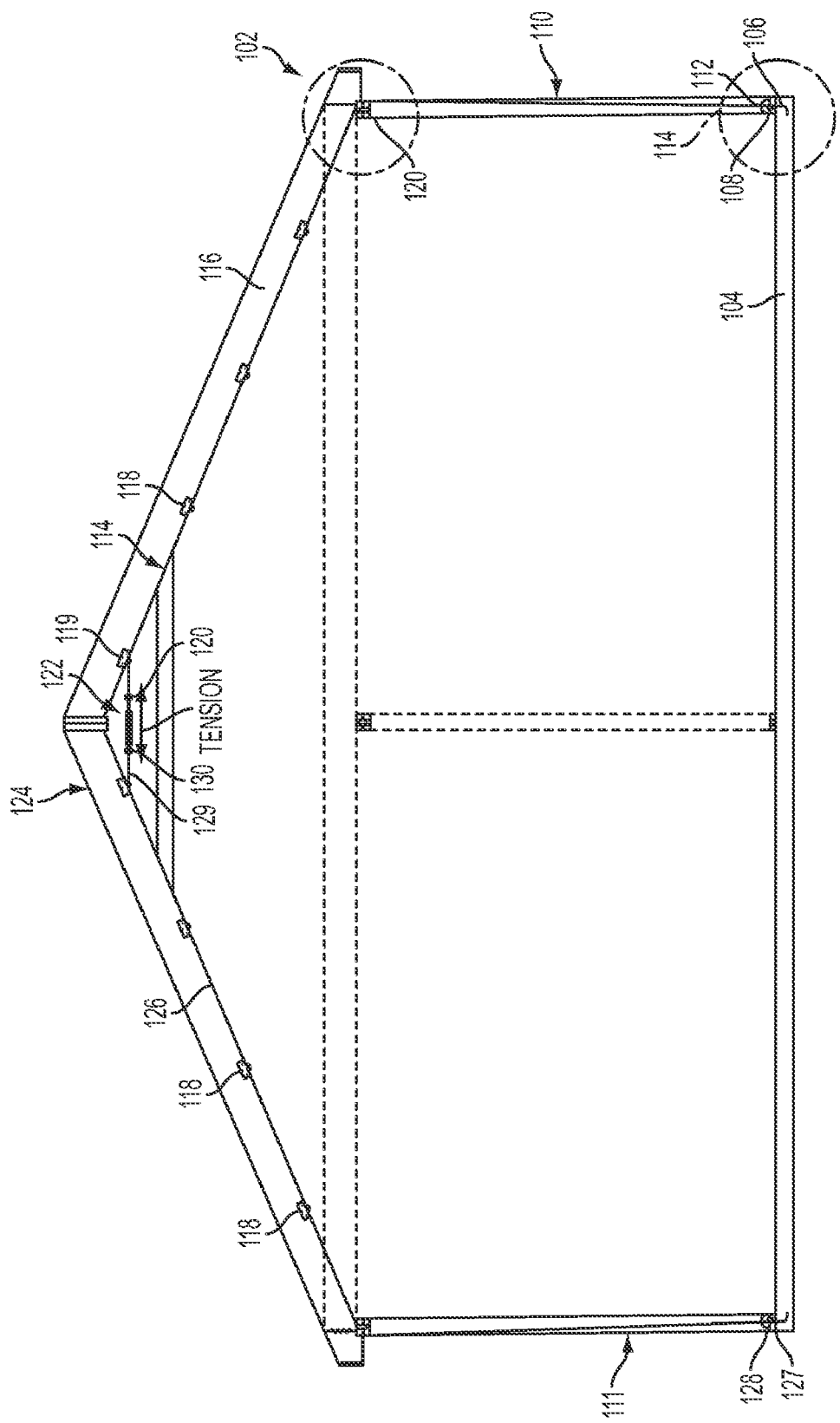
FIG. 1 illustrates a hurricane cable system according to an aspect of the present invention installed in a residential structure.

Hereinafter, all similar elements shown in the figures are referenced with identical reference numerals.

Referring to FIGS. 1-4, an embodiment of the present invention is shown installed in a house 102. As shown, the house 102 is constructed on a foundation slab 104. An anchor 106 is embedded into the foundation slab 104 through a sill plate 108 of a sidewall 110. The anchor 106 securely holds an anchor bracket 112 to the foundation slab 104. The house 102 further includes a sidewall 111, opposite to the sidewall 110.

Figure 2:
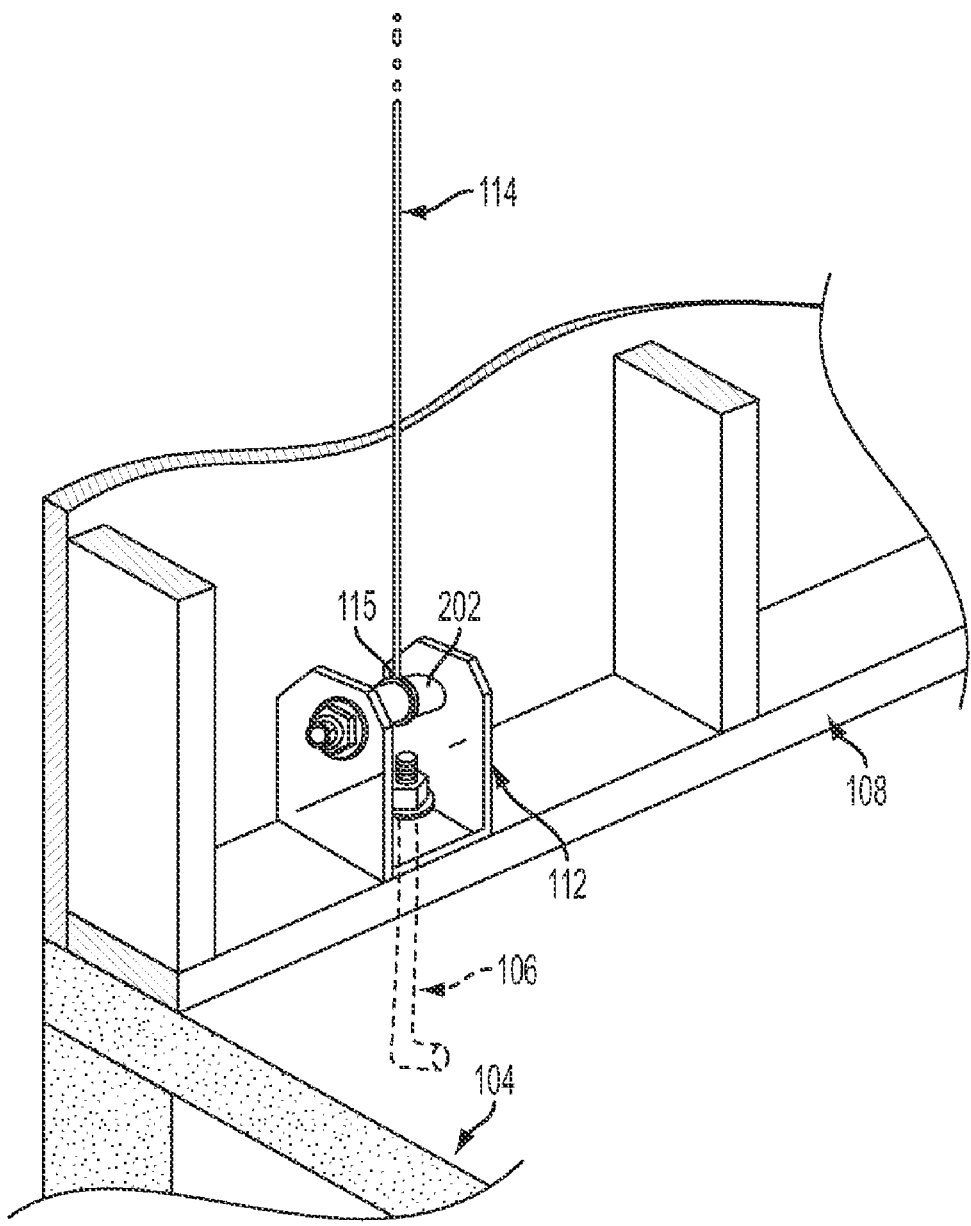
FIG. 2 illustrates a detailed view of anchor components of the embodiment shown in FIG. 1.
Figure 3:
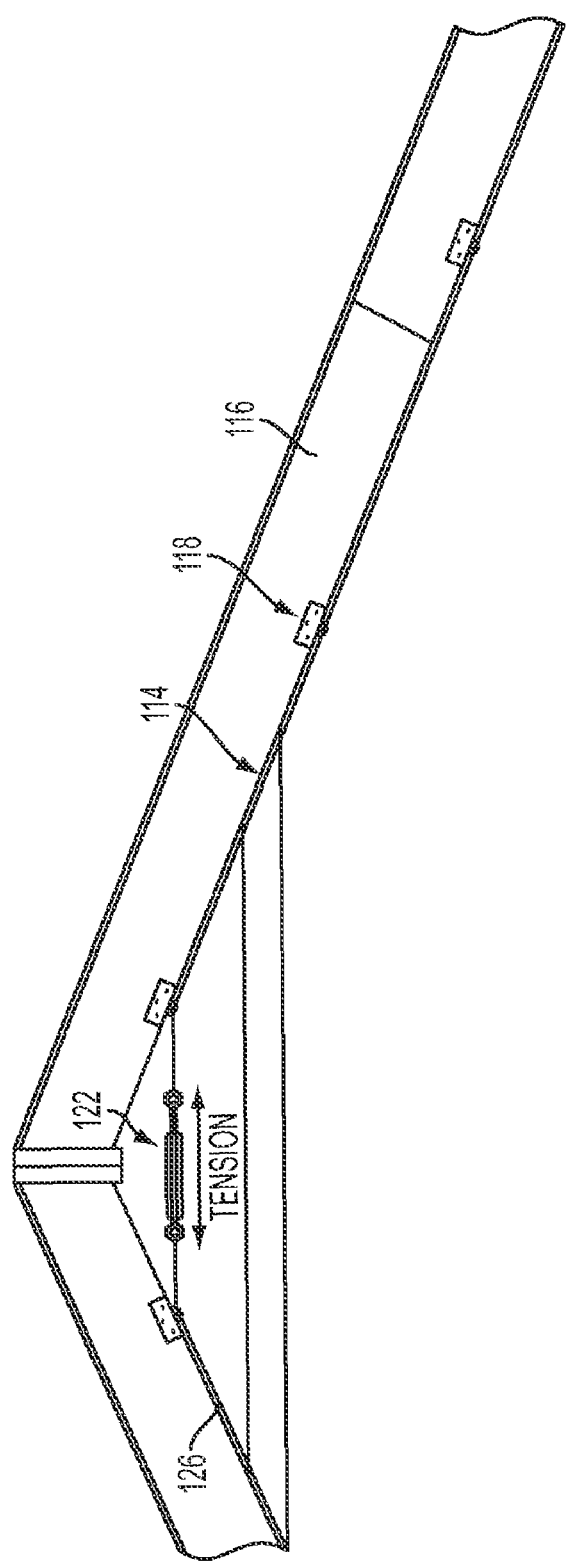
FIG. 3 illustrates a detailed view of a roof section of the residential structure shown in FIG. 1.

As shown in FIG. 2, the anchor 106 is dimensioned as an L-shaped bolt, where the 90° bend resides within or under the foundation slab 104. This shape provides a strong attachment to the foundation slab 104. However, alternative shapes may be used as well. For example, T-shaped or J-shaped anchor bolts can be used, as well as an anchor bolt having multiple arms extending perpendicular and radial from the central bolt shaft.

While the anchor shapes described above are adequate for use in new home construction where the foundation slab 104 is, for example, poured on the anchor 106, such shaped anchors are not well suited for installation in pre-existing structures. Instead, in pre-existing structures where the foundation slab 104 has already hardened, the anchor 106 can be any anchoring means capable of forming an adequately strong union between the anchoring means and the foundation slab 104. Examples of such anchoring means include, but are not limited to, wedge anchors or sleeve anchors.

Moreover, rather than embedding the anchoring means into the foundation slab, the anchor bracket 112 can be adapted for sliding underneath the sill plate, between the sill plate and the foundation slab. In this way, the anchor bracket 112 can be easily affixed to the foundation slab of a pre-existing residential structure.

A first cable 114, preferably formed of ⅛ inch braided steel or other material having sufficiently high strength, is attached to the anchor bracket 112 at a cable holding member 202 at a first cable end 115 of the first cable 114. As shown in FIG. 2, the cable holding member 202 is a bolt and nut assembly. However, alternative means for holding the cable 114 to the anchor bracket 112 can be used as well. For example, a cotter/clevis pin assembly, or hooks.

The cable 114 is routed from the foundation up through the sidewall 110 of the structure, and along a rafter 116 forming the internal support of the roof 124. The cable 114 is held along the rafter 116 by a plurality of rafter cable guides 118 secured along the rafter 116.

Figure 4:
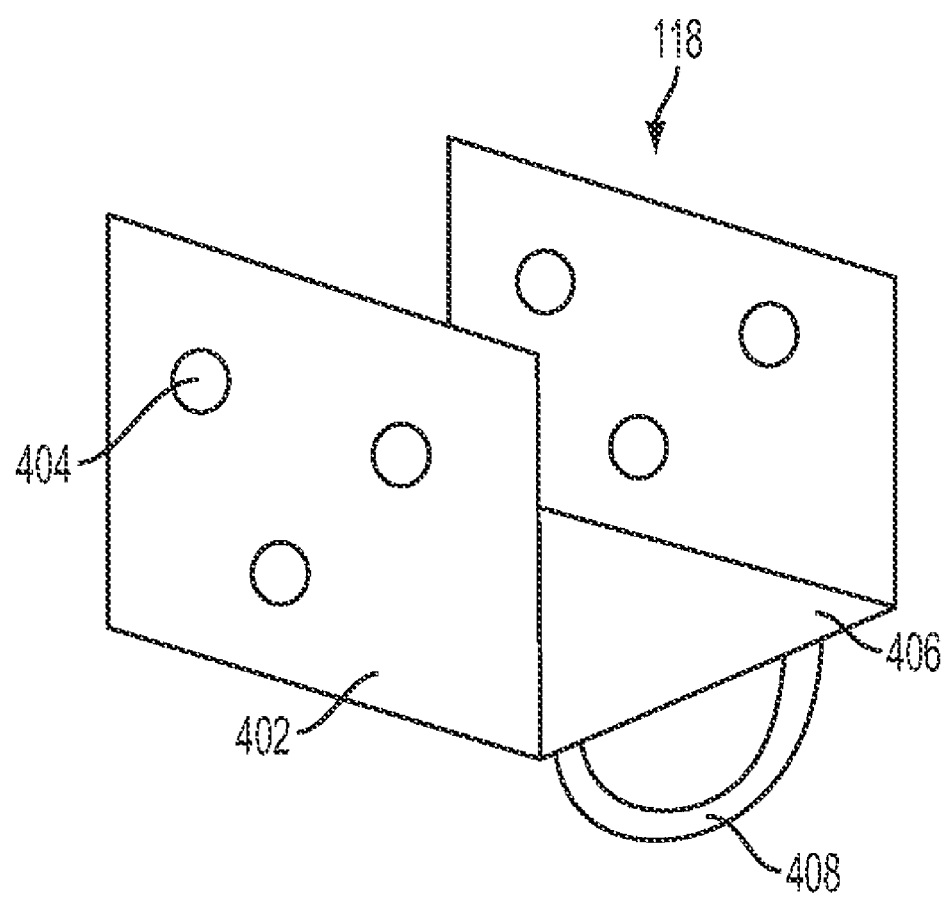
FIG. 4 illustrates a detailed view of a rafter cable guide of the embodiment shown in FIG. 1.

The rafter cable guide 118, as shown in FIG. 4, is disposed with a rafter-attaching portion that is essentially 'U-shaped' and having several holes 404 formed on the vertical surfaces 402 of the rafter cable guide 118. The holes allow nails to securely fasten the rafter cable guide 118 to a rafter 116. In addition, a cable holding section 408 is formed at a lower surface 406 of the rafter cable guide 118. The cable holding section 408 can be dimensioned as an annulus having a central opening large enough to accommodate the cable 114 in a slidable manner. Alternative means of slidably holding the cable 114 to the rafter may be used as well. For example, screw eyelets may be used. A second end 119 of the first cable 114 is secured to a first end 120 of a turnbuckle 122, or other adjustable tensioning device.

A second cable 126 is provided similarly to the first cable 114. The second cable includes a first end 127, attached to a second anchoring device 128 having an anchor, an anchor bracket and a cable holding member. The anchor, anchor bracket and cable holding member of the second anchoring device 128 are same or similar to the anchor 106, the anchor bracket 122 and the cable holding member 202 described above, respectively.

The second cable 126 further includes a second end 129, which is attached to the second end 130 of the turnbuckle 122. The turnbuckle 124 is adjusted to tension both the first cable 114 and the second cable 126 attached thereto to a specified tension force. Furthermore, the second cable 126 is also routed through a plurality of cable guides 118 disposed along the roof 124.

The turnbuckle 122 is disposed at a position between the sidewalls 110 and 111 and under the roof 124. Preferably, the turnbuckle 122 is disposed at a central position between the sidewalls, such that the first cable 114 and the second cable 126 are substantially symmetrical to each other with respect to the turnbuckle 122. By providing the first cable 114 and the second cable 126 symmetrical with respect to the tensioning member, certain advantages can be obtained. For example, the tensioning force can be applied evenly along the cables between the first end and the second end of the cables. Thus, the tie-down force of the cable can be applied evenly along the roof and the sidewalls of the house. Furthermore, since the two cables are tensioned simultaneously and symmetrically, excess tensioning of the cables can be effectively avoided. Thus, the undesirable failure of the cables due to the excess tensioning of the cables can be prevented.

The rafter cable guides 118 are disposed at predetermined intervals along the rafter. Preferably, the interval is 6 feet. However, the interval can be varied according to specific requirements of the installation.

Figure 6:
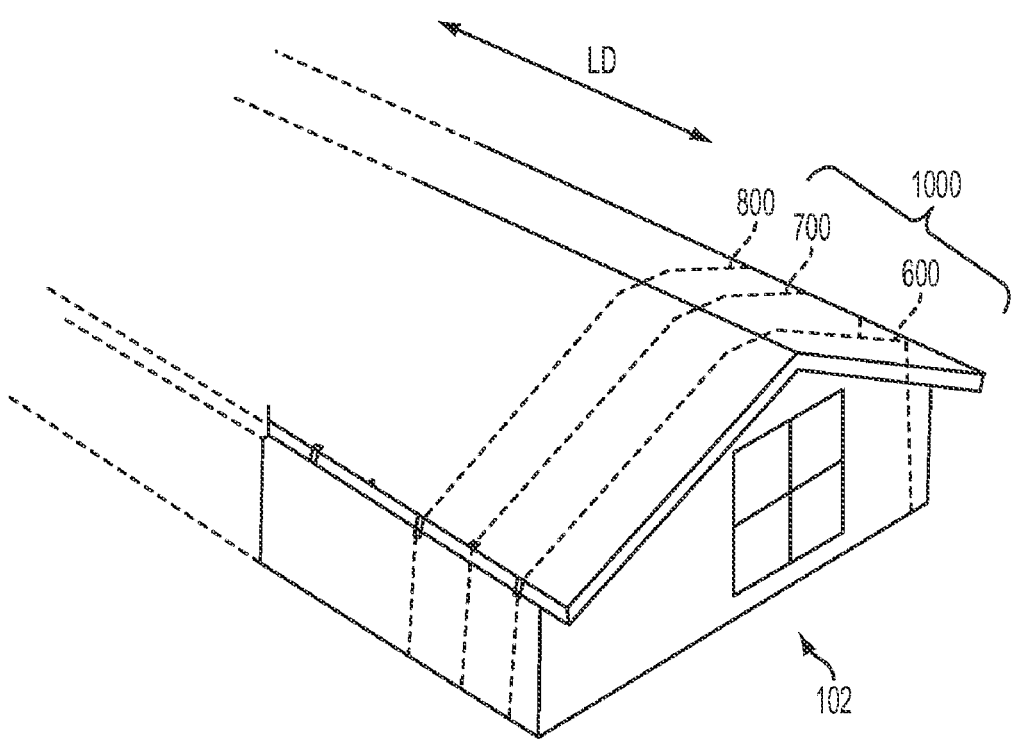
FIG. 6 illustrates a coordinate system according to another aspect of the present invention installed in a residential structure.

FIG. 6 illustrates a coordinate system 1000 installed in the house 102 for resisting damage to the structure. The coordinate system 1000 includes a plurality of hurricane cable systems as described above, for example, three hurricane cable systems 600, 700 and 800. The plurality of hurricane cable systems are disposed at predetermined intervals along a lateral direction LD of the house 102. The intervals between the cable systems can be determined based on the specific structure of the house. For example, for a house having large roof area subject to the hurricane, the intervals can be adjusted to use more cable systems along the roof Preferably, the plurality of hurricane cable systems are parallel to each other.

In a full installation of the hurricane cable system, cables are routed along a plurality of rafters, thus securing the entirety of the roof structure. In addition, the cables can be either wrapped around, or routed through a top plate 120 of the sidewall 110. Having the cables routed in such a way provides added protection against wind damage to the sidewall 110 as well.

It should be noted that while the present invention is shown installed on a gabled roof, the present invention is fully capable of being adapted to any roof structure, including, but not limited to cross-gabled, Mansard, hip, cross-hipped and Gambrel roofs.

Additionally, the present invention has been described and shown as having two opposing cables joined by a turnbuckle, or other tensioning device, at a roof ridge. However, the present invention is not limited to this configuration alone. Rather, the present invention can be practiced with a single cable running the full perimeter of the structure, with a first end of the cable anchored at the foundation slab on one side of the structure and a second end anchored at the foundation slab on the opposing side of the structure. The cable, thus being routed up one sidewall, up along a first rafter, across the roof ridge, down along a second rafter, and down the other sidewall. At least one tensioning device is provided between one of the cable ends and the respective cable anchor assembly.

Many states require that residential and commercial structures comply with set building codes, which include among other requirements the use of anchor bolts, spaced every six feet or so, embedded in the foundation slab. These anchor bolts, required by building code, are used to firmly attach the sill plates of the walls forming the structure to the foundation.

In the present invention, these same anchor bolts can be used to attach the anchor brackets to the foundation, as well.

Figure 5:
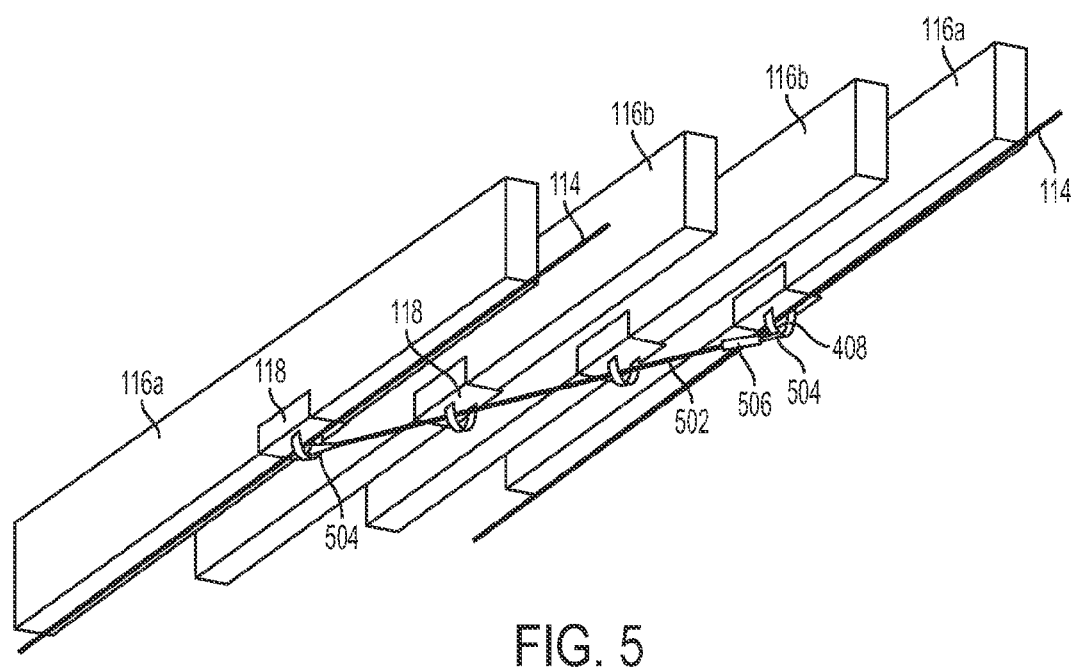
FIG. 5 illustrates a detailed view of rafters in another embodiment of the present invention.

Referring to FIG. 5, another embodiment of the present invention is shown, which addresses the issue of non-cabled rafters 116b lying between cabled rafters 116a. Specifically, the cabled rafters 116a are connected to the hurricane cable system of the present invention as discussed previously with reference to FIG. 1-4. However, in the present embodiment a cross cable 502, which runs essentially perpendicular to the path of the anchored cable 114 is connected at one end to the rafter cable guide 118 of the cabled rafter 116a. The cross cable 502 is connected to the cable holding section 408 of the rafter cable guide 118 with a connecting means 504, such as a hook, D-ring, or other appropriated device as known in the art.

The cross cable 502 is passed through rafter cable guides 118 affixed to each of the non-cabled rafters 116b. At the other end of the cross cable 502 is attached a tensioning device 506, such as a turnbuckle. At the terminal end of the tensioning device 506 another connecting means 504 is disposed for connecting the other end of the cross cable 502 to the cable holding section 408 of a rafter cable guide 118 affixed to a second cabled rafter 116a.

Once connected in the manner disclosed above, the cross cable 502 is tensioned using the tensioning device to a predetermined tension, This configuration allows the non-cabled rafters 116b to transfer any lifting forces along the cross cable 502 to the anchored cable 114 and down to the foundation. As a result, the lifting of the non-cabled rafters 116b is greatly reduced, further reinforcing the roof.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A hurricane cable system for resisting catastrophic wind damage to a structure having a roof, opposite sidewalls and a foundation, the system comprising:
   at least a pair of first and second anchoring devices, each device adapted to be fixed to the foundation at a position adjacent to one of the opposite sidewalls;
   a first cable having a first end and a second end, the first end of the first cable attached to the first anchoring device;
   a second cable having a first end and a second end, the first end of the second cable attached to the second anchoring device;
   a tensioning member disposed under the roof and at a center position between the opposite sidewalls, the tensioning member attached to the second end of the first cable and the second end of the second cable, for applying a tension force to the first cable and the second cable, wherein the first cable and the second cable are substantially symmetrical with respect to the tensioning member; and
   a plurality of cable guides affixed at intervals along the roof, each of the cable guides comprising an opening adapted for receiving one of the first cable and the second cable.

2. The hurricane cable system as in claim 1, wherein an interval between the cable guides is six feet or less.

3. The hurricane cable system as in claim 1, wherein the first cable and the second cable are $\frac{1}{8}$ inch steel cables.

4. A coordinate system for resisting catastrophic wind damage to a structure having a roof, opposite sidewalls and a foundation, the coordinate system comprising a plurality of hurricane cable systems each comprising:
   at least a pair of first and second anchoring devices, each device adapted to be fixed to the foundation at a position adjacent to one of the opposite sidewalls;
   a first cable having a first end and a second end, the first end of the first cable attached to the first anchoring device;
   a second cable having a first end and a second end, the first end of the second cable attached to the second anchoring device;
   a tensioning member disposed under the roof and at a center position between the opposite sidewalls, the tensioning members attached to the second end of the first cable and the second end of the second cable, for applying a tension force to the first cable and the second cable, wherein the first cable and the second cable are substantially symmetrical with respect to the tensioning member; and
   a plurality of cable guides affixed at intervals along the roof, each of the cable guides comprising an opening adapted for receiving one of the first cable and the second cable a cable.

5. The coordinate system as in claim 4, wherein the plurality of the hurricane cable systems are disposed at predetermined intervals along a lateral direction of the structure.

6. The coordinate system as in claim 5, wherein the plurality of the hurricane cable systems are disposed substantially parallel to each other.

7. The coordinate system as in claim 4, wherein an interval between the cable guides is six feet or less.

8. The coordinate system as in claim 4, wherein the first cable and the second cable are $\frac{1}{8}$ inch steel cables.

9. A method for resisting catastrophic wind damage to a structure having a roof, opposite sidewalls and a foundation, comprising:
   fixing a first anchoring device to the foundation at a first position adjacent to one of the opposite sidewalls and fixing a second anchoring device to the foundation at a second position adjacent to the other of the opposite sidewalls;
   attaching a first cable to the first anchoring device and a second cable to the second anchoring device;
   disposing a tensioning member under the roof and at a center position between the opposite sidewalls and disposing the first cable and the second cable substantially symmetrical with respect to the tensioning member;
   attaching the tensioning member to both the first cable and the second cable; and
   applying a tension force to the first cable and the second cable through the tensioning member.

10. The method as in claim 9, further comprising routing the first cable and the second cable through a plurality of cable guides.

11. The method as in claim 10, further comprising distributing the cable guides at predetermined intervals along the roof.

* * * * *

UNITED STATES PATENT AND TRADEMARK OFFICE
CERTIFICATE OF CORRECTION

| | | |
|---|---|---|
| PATENT NO. | : 8,272,171 B2 | Page 1 of 1 |
| APPLICATION NO. | : 12/722201 | |
| DATED | : September 25, 2012 | |
| INVENTOR(S) | : James Curry, III | |

It is certified that error appears in the above-identified patent and that said Letters Patent is hereby corrected as shown below:

On the Title Page, Item (54) and in the Specification, Column 1, lines 1 and 2, Title Should Read:

HURRICANE CABLE SYSTEM AND METHOD OF USE THEREOF

Signed and Sealed this
Twenty-fifth Day of February, 2014

Michelle K. Lee
*Deputy Director of the United States Patent and Trademark Office*